United States Patent Office 3,090,778
Patented May 21, 1963

3,090,778
PRODUCTION OF POWDERED POLYETHYLENE
Paul Ehrlich, Hampden, Mass., and Dennis E. Wade, Texas City, Tex., assignors to Monsanto Chemical Company, St. Louis, Mo., a corporation of Delaware
No Drawing. Filed Sept. 26, 1962, Ser. No. 226,473
10 Claims. (Cl. 260—94.9)

This invention relates to the production of powdered polyethylene. More particularly it relates to the production of powdered polyethylene at high pressures and temperatures in a tubular reactor and its subsequent recovery.

It is known that ethylene and certain other olefin hydrocarbons can be converted into solid and semi-solid polymers of high molecular weight by subjecting these hydrocarbons to a polymerization reaction at from 500 to 3,000 atmospheres and at temperatures between 40° C. and 400° C. An initiator such as oxygen or per-oxygen type compounds must be introduced into the reactor to begin the polymerization. Generally, the polymerization reaction is conducted in either an autoclave type vessel or a tubular reaction zone. The autoclave reactor is generally utilized where an inert solvent is also introduced with the polymerizable hydrocarbon and the tubular reaction zone is normally employed in the so-called mass polymerization or non-solvent polymerization reaction. In either case, the mixture of polymer and monomer is recovered through a high pressure let-down valve which reduces the pressure and permits separation of the polymer from the reaction mixture in a series of separation steps. These steps consist of reducing the pressure to about 2,000 p.s.i. to 5,000 p.s.i. in a gravity separator wherein the polymer settles and the monomer leaves from the top of the vessel through a recycle line. The polymer may be reduced in pressure through another let-down valve to another gravity separator where additional entrained monomer is recovered from the vessel through another recycle line. The polymer is then fed to an extruder and recovered as a ribbon or in the form of pellets. Under no conditions known heretofore, has a high pressure olefin-polymer such as polyethylene been recovered from a high pressure polymerization process other than as a molten mass.

There are a number of prior art processes which call for the treatment of solid polymers, such as polyethylene, to form a finely divided, or powdered material. Usually the processes call for dissolving the polymer in an organic liquid such as an alcohol, an aromatic hydrocarbon or a light petroleum liquid such as gasoline. The solution is then cooled to effect settling of the polymer in the form of a very fine powder which is recovered by filtration or evaporation. Another process provides for dissolving a solid polyethylene in an organic gas at high pressure and high temperature, thereafter reducing the pressure and temperature through a release valve in a series of steps. A powdered polyethylene is recovered from the last pressure vessel. All of these processes call for the treatment of a normally solid polyethylene in order to form a powdered product and are consequently expensive and time consuming operations.

It has now been discovered that powdered polyethylene can be produced directly from a tubular reaction zone operated at high pressure and temperature. Also, powdered polyethylene can then be recovered from a gas-solid separator into which the polymerization mixture is discharged from the high pressure let-down valve at the exit of the tubular reaction zone.

It is therefore, an object of this invention to provide a powdered polymer of ethylene. Another object of this invention is to produce powdered polymers of ethylene in a tubular reaction zone operated at high pressures and temperatures. A still further object of this invention is to produce powdered polymers of ethylene directly from the reactor without the step of recovering solid polymers of ethylene from the polymerization step and treating the polymer so obtained to produce a powder. An additional object of this invention is to provide an improved method for the separation of solid polymers of ethylene in a powdered form from the polymerization reaction mixture. These and other objects of the invention will become apparent from the following description.

According to this invention, powdered polymers of ethylene are produced in a tubular reaction zone wherein the polymers have been polymerized under conditions of elevated temperatures and pressures in the presence of a free-radical-generating initiator for the polymerization, by cooling the polymerization mixture in the tubular reaction zone, withdrawing said cooled polymerization mixture from said tubular reaction zone and reducing the pressure and temperature of the same below the melting point of the polymer to effect formation of ethylene polymer in powdered form. Further, according to this invention, separation of the polymerization mixture obtained from a tubular reaction zone at a temperature below the melting point of the polymer, is accomplished by a single step of gas-solids separation to obtain powdered ethylene polymers of uniform particle sizes.

The following examples will illustrate the invention but are not to be construed as limiting it in any manner whatsoever.

*Example I*

Ethylene, together with oxygen as an initiator, is compressed to about 30,000 p.s.i. and fed to a tubular reactor of about 5/8" in diameter and of a length of 5 sections, each of which is 16 feet, at a rate of about 150 lbs./hr. The reaction temperature rises to a peak of about 250° C. and then falls to approximately 200° C. before entering the final 16 foot section of the reactor. Cooling water is fed to the jacket of the final section of the tubular reactor and the ethylene-polyethylene mixture is cooled to 80° C. The reaction mass of polymer and unreacted ethylene is then reduced in pressure by passage through a high pressure let-down valve and discharged to a gas-solids separator maintained at about 100 p.s.i. pressure. The polymer collected from the separator consists of uniform powdery, polymeric particles of from about 20 to about 100 microns in size. The powdered polyethylene has a melt index of about 3.0 and a density of about 0.92 gram per cc.

*Example II*

Ethylene and about 2 percent by weight propane, together with oxygen as an initiator, were compressed to about 32,000 p.s.i. and fed to a tubular reaction zone of 5/16" in diameter and 18 sections in length, each section being about 16 feet, at rate of about 130 lbs./hr. The reaction temperature rose to a peak of about 300° C. and was then reduced to approximately 200° C. in the tubular reaction zone. The reaction mass of polymer and unreacted ethylene was then reduced to atmospheric pressure and to a temperature of about 100° C. by passage through a high pressure let-down valve and discharged into a gas-solids separator. The polymer collected from the separator consisted of a uniform mass of powdered polyethylene. The polymer had a melt index of about 0.2 and a density of about 0.922 gram per cc.

*Example III*

Ethylene and about 0.4 percent isobutylene as a comonomer, together with oxygen as an initiator, were compressed to about 32,000 p.s.i. and fed to a tubular reaction zone of 5/16" in diameter and 18 sections in length, each section being 16 feet, at a rate of about 130 lbs./hr. The reaction temperature rose to a peak of about 300° C. and was then reduced to approximately 200° C.

in the tubular reaction zone. The reaction mass of polymer and unreacted ethylene was then reduced to atmospheric pressure and to a temperature of about 100° C. by passage through a high pressure let-down valve and discharged into a gas-solids separator. The polymer collected from the separator consisted of a uniform mass of powdered ethylene-isobutylene copolymer. The polymer had a melt index of about 3.0 and a density of about 0.920 gram per cc.

It is apparent from the above examples that polyethylene can be recovered in a powdery state from a continuous tubular polymerization reactor by withdrawing the polymerization mixture from the tubular reaction zone through a pressure reducing valve so that the temperature is below the melting temperature of the polymer at the reduced pressure.

It has been found that the process of this invention is uneffected by the contamination of the polymer with quantities of unreacted monomer. For example, the presence of unreacted ethylene in the polyethylene reaction product does not effect the attainment of the powdered polyethylene and the process provides a means for separating the polymer from the unreacted monomer.

Although only the production of a homopolymer of ethylene and one copolymer of ethylene in a powdered form have been exemplified, any solid copolymer of ethylene is within the scope of this invention although generally the applicable copolymers are those having 50 percent or more by weight polyethylene. For example, copolymers of ethylene and vinyl esters such as ethylene acrylate of vinyl propionate and vinyl acetate can be produced by the process of this invention. In addition, copolymers of ethylene and any olefin having no more than 8 carbon atoms such as propylene or butene-1 can also be produced in a powdered condition.

The tubular reactor exemplified may be of any shape or size. For instance, it may be convolute in form or it may be straight. In practice, a number of sections of tubular reactors are attached and a necessary feature other than the usual requirements for polymerization is that the last section be sufficient in length to decrease the temperature of the reaction mass to a temperature, for instance, about 200° C. or lower, so that the polymer after expansion through a high pressure let-down valve is below its melting point. Generally speaking the melting point temperature is about 110° C. but for extremely low molecular weight polymers it may be lower. The desired temperature after expansion is preferably about 80° C. or lower. Ordinarily the reactor length needed to cool the reaction mass must be about 20 percent to 30 percent of the reactor length but may vary up to 50 percent of the reactor length depending on the flow rate, tube diameter and temperature required. The usual method for reducing the temperature of the polymerization mixture is to circulate cooled water in the jackets of the reactor tubes although other methods may also be used.

The conditions of temperature and pressure employed in the polymerization may vary over a wide range. Depending upon the initiator used, the temperature may vary from 120 C. to about 400 C. It is generally preferred to operate at a temperature in the range from about 150° C. to about 300° C. Pressures of from about 25,000 p.s.i. up to about 60,000 p.s.i. are employed in the polymerization with those from 26,000 p.s.i. to about 45,000 p.s.i. being preferred. In cases when extremely low molecular weight polymer is produced, a pressure as low as 22,000 p.s.i. may be used. Although little is known about the phase condition of the reaction mass inside the reactor, it is generally believed that in order to carry out the process of this invention the entire polymerization must be carried out in a single fluid phase.

In addition to the oxygen exemplified in the example, the high pressure polymerization in this process can be initiated with any organic or inorganic compound which generates free radicals or a mixture of such compounds. Among examples of such materials are per-oxygen type compounds such a hydrogen peroxide, dialkyl dioxides like diethyl peroxide and ditert-butyl peroxide, butyryl peroxide, lauroyl, benzoyl peroxide, alkyl hydroperoxides, diperoxydicarbonate esters, tert alkyl percarboxylates such as tert-butylperbenzoate, potassium persulfate and the like; azo bis (isobutyronitrile); azines such as benzalazine; oximes such as acetone oxide, etc. Only small amounts of initiator are required to polymerize the reaction. Generally, initiator concentration will vary from about 0.0001 percent to about 2 percent of the total weight of monomer charged to the polymerization reaction.

Polymerization modifiers, sometimes called chain transfer agents, may be used if desired. They may assist in some cases to decrease the production of cross-linked polymers which do not readily form a single phase with ethylene in the reactor. Among the many such compounds used as modifiers are saturated hydrocarbons such as propane and cyclohexane, alcohols such as tert butyl alcohol, aromatic hydrocarbons such as toluene, other olefinic hydrocarbons such as butene and various other compounds such as acetone, hydrogen, carbon dioxide and phenolic compounds. Generally, the amount of a modifier employed is in the range from about 0.1 to about 10 mole percent of the total monomer feed.

The advantages of this method of producing powdered polymers of ethylene are obvious. The operation is exemplified in that no subsequent step need be taken after the polymer is recovered from the polymerization reactor, no undesirable side reactions occur in the let-down separator which might interfere with the subsequent production of powdered polymer and the material is recovered in a form immediately suitable for use in such applications as spray coating or flame spraying.

The separator generally employed for the recovery of the powdered ethylene polymers withdrawn from the tubular reaction zone through a high pressure let-down valve is a two phase gas-solids separator of conventional design. Other types of separators may be used to recover the powdered ethylene polymers, for instance, filters and screens as well as other types, are suitable. The advantages of a separation method of this invention which are readily apparent to those skilled in the art are the simplicity of the equipment required, the low pressure needed for operation, and the ease of maintaining the proper temperature. The pressure required for this separation step is usually in the range from about atmospheric to about 500 p.s.i. although higher pressures of up to about 750 p.s.i. may be used as long as the ethylene monomer may be recovered as a gas for recycle. Preferably, the pressure is from about 100 p.s.i. to about 200 p.s.i. The pressure may be reduced gradually in a series of steps but it is preferred to make the pressure reduction in a single operation. The temperature of the polymerization mixture in the separator is critical since it is necessary that the polymer be maintained below its melting point to recover the polymer in a powdered form.

What is claimed is:

1. A process for the production of ethylene polymers in powdered form in a tubular reaction zone at elevated temperatures and pressures in the presence of a free-radical-generating initiator for the polymerization, said process comprising cooling the polymerization reaction mixture in said tubular reaction zone, withdrawing said cooled polymerization mixture from said tubular reaction zone, reducing the pressure of said cooled polymerization mixture and recovering said ethylene polymers in a powdered form at a temperature below the melting point of the polymer as the product of the process.

2. A process for the production of ethylene polymers in powdered form in a tubular reaction zone at elevated temperatures and pressures in the presence of a free-radical-generating initiator for the polymerization, said process comprising cooling the polymerization reaction mixture in said tubular reaction zone, withdrawing said cooled polymerization mixture from said tubular reaction zone, reducing the pressure and temperature of said cooled polymerization mixture below the melting point of the polymer and recovering said ethylene polymers in a powdered form as the product of the process.

3. The process of claim 1 wherein said polymerization is carried out at a pressure in the range from about 25,000 p.s.i. to about 60,000 p.s.i. and at a temperature from about 120° C. to about 400° C.

4. The process of claim 1 wherein said polymerization mixture is cooled so that the temperature after expansion is below 110° C.

5. The process of claim 1 wherein the pressure of said cooled polymerization mixture is reduced to a pressure of less than 500 p.s.i. for recovery of the powdered ethylene polymers.

6. The process of claim 1 wherein the ethylene polymer is polyethylene.

7. The process of claim 6 wherein the particle size of the powdered polyethylene is from about 20 to about 100 microns.

8. A process for the production of ethylene polymers in powdered form in a tubular reaction zone at elevated temperatures and pressures in the presence of a free-radical-generating initiator for the polymerization, said process comprising cooling the polymerization reaction mixture in said tubular reaction zone to a temperature below the solidification point of the polymer, withdrawing said cooled polymerization mixture from said tubular reaction zone, reducing the pressure of said cooled polymerization mixture to vaporize the remaining polymerization monomer, separating said ethylene polymers in powdered form from said vaporized polymerization mixture in a gas-solids separation means and recovering said ethylene polymers in powdered form as the product of the process.

9. A process for the production of ethylene polymers in powdered form from a tubular reaction zone at elevated temperatures and pressures in the presence of a free-radical-generating initiator for the polymerization, said process comprising cooling the polymerization mixture in said tubular reaction zone, withdrawing said cooled polymerization mixture from said tubular reaction zone, reducing the pressure and temperature of said cooled polymerization mixture below the melting point of the polymer to vaporize the remaining polymerization monomer, separating said ethylene polymers in a powdered form from said vaporized polymerized mixture in a gas-solids separation means and recovering said ethylene polymers in a powdered form as the product of the process.

10. The process of claim 9 wherein the pressure of said cooled polymerization mixture is reduced by means of a high pressure let-down valve.

No references cited.